(12) United States Patent
Matsuoka

(10) Patent No.: US 6,885,867 B2
(45) Date of Patent: Apr. 26, 2005

(54) MOBILE COMMUNICATIONS SYSTEM, BASE STATION, AND MOBILE TERMINAL

(75) Inventor: Masayoshi Matsuoka, Nagoya (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 332 days.

(21) Appl. No.: 10/267,408

(22) Filed: Oct. 9, 2002

(65) Prior Publication Data

US 2003/0087655 A1 May 8, 2003

(30) Foreign Application Priority Data

Oct. 11, 2001 (JP) ........................................ 2001-314372

(51) Int. Cl.$^7$ ................................................ H04Q 7/20
(52) U.S. Cl. ................ 455/436; 455/437; 455/438; 455/439; 370/331; 370/329; 370/509; 375/137; 375/149; 375/354; 340/825.2; 340/825.22
(58) Field of Search ................................ 455/436, 437, 455/438, 439; 370/331, 329, 509, 510; 375/137, 149, 357; 340/825.2, 825.22, 7.2

(56) References Cited

U.S. PATENT DOCUMENTS

| | | | |
|---|---|---|---|
| 6,055,427 A | | 4/2000 | Ojaniemi |
| 6,278,881 B1 | | 8/2001 | Balck |
| 6,323,784 B1 | * | 11/2001 | Miyashita ................... 340/7.2 |
| 6,327,469 B1 | * | 12/2001 | Gaastra ....................... 455/436 |
| 6,483,825 B1 | * | 11/2002 | Seta ............................ 370/335 |
| 6,563,807 B1 | * | 5/2003 | Kim et al. ................... 370/331 |
| 6,657,984 B1 | * | 12/2003 | Semper ....................... 370/338 |
| 6,697,622 B1 | * | 2/2004 | Ishikawa et al. ............ 455/434 |
| 6,829,253 B1 | * | 12/2004 | Koorapaty et al. ......... 370/514 |

FOREIGN PATENT DOCUMENTS

| | | |
|---|---|---|
| EP | 0439 630 | 8/1991 |
| EP | 0 635 990 | 1/1995 |
| EP | WO 01/63851 | 8/2001 |

* cited by examiner

*Primary Examiner*—William Trost
*Assistant Examiner*—Danh C Le (57) ABSTRACT

A mobile terminal 11 and a base station 12 use a first communication channel (i.e. a transmission route 21) to conduct communication relating to a first call. A first time (i.e. switching time) and a second time (i.e. switching-back time) during the communication are determined, and when the switching time is reached, communication using transmission route 21 is ceased and attempts are made to establish spreading code synchronization in order for mobile terminal 11 and base station 12 to commence using a second communication channel (i.e. a transmission route 22) to conduct communication relating to both the first call and a second call. If synchronization cannot be established before the switching-back time is reached, attempts to establish synchronization are ceased, and mobile terminal 11 and base station 12 recommence using transmission route 21 to conduct communication.

8 Claims, 8 Drawing Sheets

MOBILE COMMUNICATIONS SYSTEM, BASE STATION, AND MOBILE TERMINAL

This application is based on application no. 2001-314372 filed in Japan, the contents of which are hereby incorporated by reference.

BACKGROUND OF THE INVENTION

1. Field of the Invention

The present invention relates to a mobile communications system for conducting uninterrupted hard handover.

2. Related Art

Figure 1:
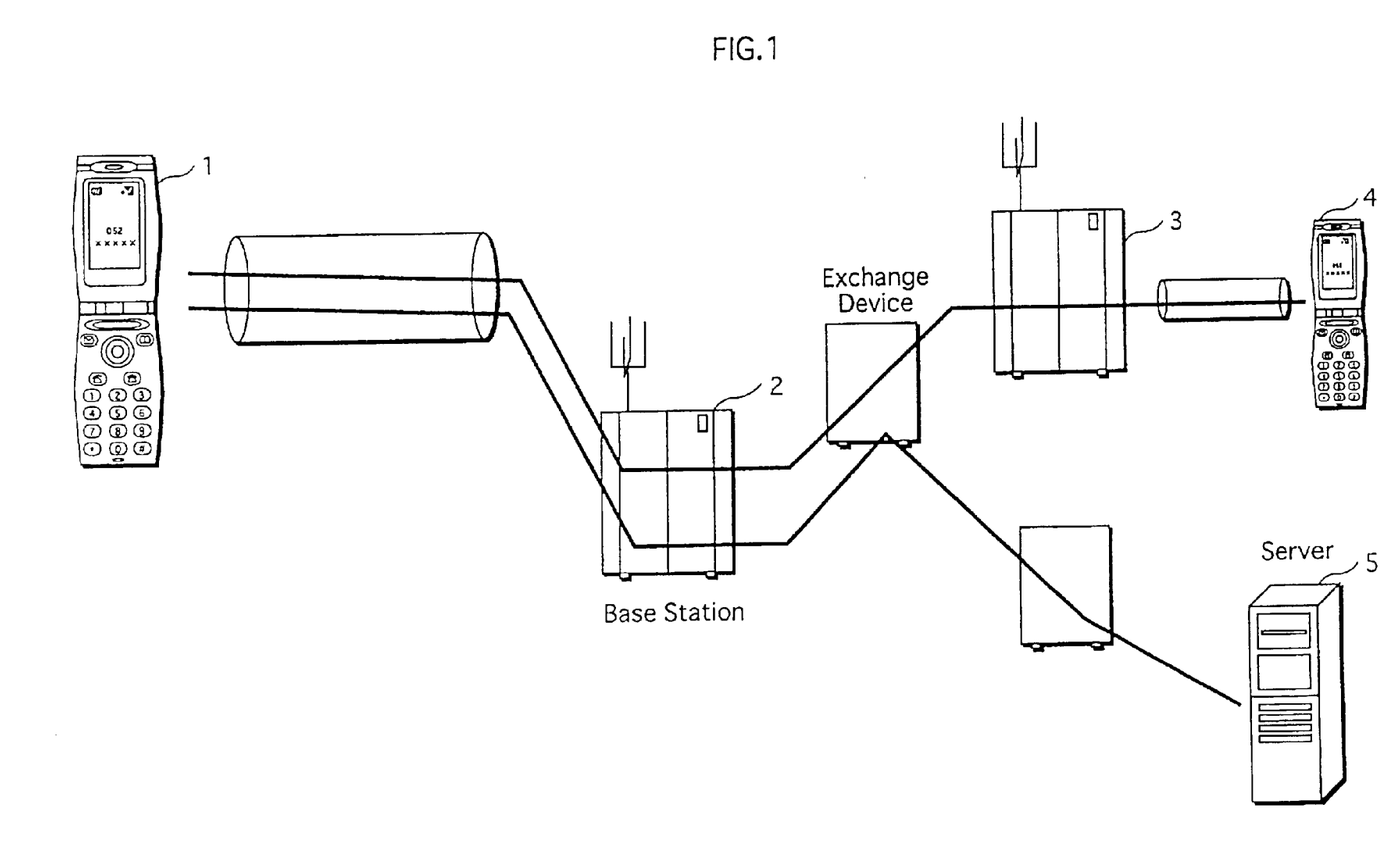
FIG. 1 shows the simultaneous communication of calls relating to both audio communication and packet communication.

As disclosed in application no. 2001-309432 filed in Japan, W-CDMA (wideband code division multiple access) allows a single mobile terminal to conduct simultaneous communication of a plurality of calls grouped into audio communications, packet communications, and combined audio/packet communications. An example of this is shown in FIG. 1. FIG. 1 shows a mobile terminal 1 conducting audio communication with another mobile terminal via a base station 2 and a base station 3, while at the same time conducting packet communication with a server 5 over the Internet.

Furthermore, as disclosed in application no. 2001-231063 filed in Japan, technology that allows for the switching of channels without interruption, referred to as uninterrupted hard handover (hereafter "HHO"), has become standardized in W-CDMA.

In a mobile communications system that uses these technologies, it is possible to vary the number of calls during communication without interruption. Thus, for example, if a mobile terminal is conducting audio communication with another mobile terminal using a certain channel, the mobile terminal can conduct HHO during the audio communication and switch to a channel that combines audio and packet communications.

However, the rate at which call blocking occurs is higher when channel switching to add calls then it is when channel switching to reduce calls. This is because the symbol rate and the spreading rate are inversely proportional at a fixed chip rate according to W-CDMA, and thus when a call is added, the symbol rate is increased and the spreading rate is decreased. Here, the lower the spreading rate, the more difficult it is to establish spreading code synchronization.

When call blocking occurs in this instance, not only is it impossible to initiate communication of the additional call, but communication of the connected call is also cut.

SUMMARY OF THE INVENTION

An object of the present invention is to provide a mobile communications system, a base station, a mobile terminal, and a related method that eliminate the above problems using readily applicable measures.

A mobile communications system provided to achieve the above object is based on the CDMA standard, has a mobile terminal and a base station, and includes a communication unit for using a first communication channel to conduct communication relating to a first call between the mobile terminal and the base station; a determining unit for determining a first time and a second time mutually between the mobile terminal and the base station; a sync-establishing unit for, when the first time is reached, having the communication unit cease communication using the first communication channel, and attempting to establish synchronization between the mobile terminal and the base station in order to commence using a second communication channel to conduct communication relating to both the first call and a second call; and a recommencing unit for, if synchronization cannot be established before the second time is reached, having the sync-establishing unit cease attempts to establish synchronization, and having the communication unit recommence using the first communication channel to conduct communication relating to the first call.

According to this structure, the mobile terminal and the base station recommence communication using a first communication channel if spreading code synchronization cannot be established over a second communication channel before a second time is reached. Consequently, communication relating to a first call can be continued, even if the addition of a second call cannot be realized. The fact that the mobile terminal and the base station mutually determine the second time before attempts are made to establish synchronization allows for this effect to be realized.

Here, instead of mutually determining a second time, the determining unit may determine a certain time period mutually between the mobile terminal and the base station. This time period (i.e. a probatory period) corresponds to the period of time between the first time and the second time. In this case, the sync-establishing unit and the recommencing unit conduct their various processing operations when the determined probatory period has elapsed from the first time (i.e. instead of when the second time is reached). The elapse of the probatory period from the first time may be detected by providing, in at least one of the base station and the mobile terminal, an internal timer or the like for measuring the elapsed time.

Here, in the mobile communications system, the communication unit may have a terminal communication subunit included in the mobile terminal, and for using the first communication channel to conduct communication relating to the first call with the base station; and a station communication subunit included in the base station, and for using the first communication channel to conduct communication relating to the first call with the mobile terminal. The determining unit may have a request notifying subunit included in the mobile terminal, and for receiving a communication channel switching request from a user and notifying the base station of the received request; a time notifying subunit included in the base station, and for determining the first time and the second time in accordance with the notified request, and notifying the mobile terminal of the determined times; and an obtaining subunit included in the mobile terminal, and for obtaining the determined times notified by the time notifying subunit. The sync-establishing unit may have a distribution subunit included in the base station, and for, when the first time determined by the time notifying subunit is reached, distributing a synchronization signal in order to establish synchronization over the second communication channel; and a notifying subunit included in the mobile terminal, and for, when the first time obtained by the obtaining subunit is reached, receiving the distributed synchronization signal, detecting for a synchronization timing, and notifying the base station that synchronization has been established if the synchronization timing is detected. The recommencing unit may have a terminal recommencing subunit included in the mobile terminal, and for, if the synchronization timing cannot be detected before the second time obtained by the obtaining subunit is reached, having the detecting subunit cease detecting for the synchronization signal, and having the terminal communication subunit recommence using the first communication channel to conduct communication relating to the first call; and a station recommencing subunit included in the base station, and for, if notification of synchronization being established is not received before the second time determined by the time notifying subunit is reached, having the station communication subunit recommence using the first communication channel to conduct communication relating to the first call.

Here, in the mobile communications system, the determining unit may determine a third time mutually between the mobile terminal and the base station, and the recommencing unit may have the sync-establishing unit try again to establish synchronization if communication by the communication unit using the first communication channel cannot be recommenced before the third time determined by the determining unit is reached.

According to this structure, when a third time is reached, the mobile terminal and the base station once again attempt to establish spreading code synchronization in order to conduct communication relating to the first and second calls over the second communication channel, and as a result the incidence of call blocking can be reduced.

The above object may also be achieved by a mobile communications system based on the CDMA standard and having a mobile terminal and a base station. The base station includes a first communication unit for using a first communication channel to conduct communication relating to a first call with the mobile terminal; and a second communication unit for, in parallel with communication conducted by the first communication unit, using a second communication channel to conduct communication relating to both the first call and a second call with the mobile terminal. The mobile terminal includes a third communication unit for using the first communication channel to conduct communication relating to the first call with the base station; a storage unit for storing in advance a first time and a second time; a sync-establishing unit for, when the first time is reached, having the third communication unit cease communication using the first communication channel, and attempting to establish synchronization with the base station in order to commence using the second communication channel to conduct communication relating to both the first and second calls; and a recommencing unit for, if synchronization cannot be established before the second time is reached, having the sync-establishing unit cease attempts to establish synchronization, and having the third communication unit recommence using the first communication channel to conduct communication relating to the first call.

According to this structure, the base station simultaneously uses the first communication channel and the second communication channel to conduct communication, whereas the mobile terminal initially uses only the first communication channel to conduct communication with the base station. Then, when a first time is reached, the mobile terminal ceases communication using the first communication channel and attempts to establish spreading code synchronization with the base station over the second communication channel, and if synchronization cannot be established before a second time, the mobile terminal recommences communication using the first communication channel. Consequently, it is not necessary for the mobile terminal to mutually determine the first time and the second time with the base station, and nor is it necessary for the base station to use a timer or the like to monitor the first and second times.

Here, in the mobile communications system the sync-establishing unit may notify the base station if synchronization is established, and the first communication unit may cease communication using the first communication channel if the base station is notified by the sync-establishing unit that synchronization has been established.

According to this structure, the first communication unit ceases using the first communication channel once synchronization over the second communication channel has been established, and thus the efficiency of traffic usage is improved.

A base station provided to achieve the above object is used in a mobile communications system based on the CDMA standard, and has a first communication unit for using a first communication channel to conduct communication relating to a first call with a mobile terminal; and a second communication unit for, in parallel with communication conducted by the first communication unit, using a second communication channel to conduct communication relating to both the first call and a second call with the mobile terminal.

A mobile terminal provided to achieve the above object is used in a mobile communications system based on the CDMA standard, and has a communication unit for using a first communication channel to conduct communication relating to a first call with a base station; a storage unit for storing in advance a first time and a second time; a sync-establishing unit for, when the first time is reached, having the communication unit cease communication using the first communication channel, and attempting to establish synchronization with the base station in order to commence using a second communication channel to conduct communication relating to both the first call and a second call; and a recommencing unit for, if synchronization cannot be established before the second time is reached, having the sync-establishing unit cease attempts to establish synchronization, and having the communication unit recommence using the first communication channel to conduct communication relating to the first call.

A method provided to achieve the above object is for conducting mobile communications between a mobile terminal and a base station, and includes a communication step of using a first communication channel to conduct communication relating to a first call between the mobile terminal and the base station; a determining step of determining a first time and a second time mutually between the mobile terminal and the base station; a sync-establishing step of, when the first time is reached, ceasing communication using the first communication channel, and attempting to establish synchronization between the mobile terminal and the base station in order to commence using a second communication channel to conduct communication relating to both the first call and a second call; and a recommencing step of, if synchronization cannot be established before the second time is reached, ceasing attempts to establish synchronization, and recommencing use of the first communication channel to conduct communication relating to the first call.

The above object may also be achieved by a method for conducting mobile communications between a mobile terminal and a base station, and that includes a first communication step performed in the base station, and of using a first communication channel to conduct communication relating to a first call with the mobile terminal; a second communication step performed in the base station, and of, in parallel with communication conducted in the first communication step, using a second communication channel to conduct communication relating to both the first call and a second call with the mobile terminal; a third communication step performed in the mobile terminal, and of using the first communication channel to conduct communication relating to the first call with the base station; a sync-establishing step performed in the mobile terminal, and of (i) storing a first time and a second time in an internal memory of the mobile terminal, and (ii) when the first time is reached, ceasing communication using the first communication channel, and attempting to establish synchronization with the base station in order to commence using the second communication channel to conduct communication relating to both the first and second calls; and a recommencing step of, if synchronization cannot be established before the second time is reached, ceasing attempts to establish synchronization, and recommencing use of the first communication channel to conduct communication relating to the first call.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings.

DETAILED DESCRIPTION OF THE PREFERRED EMBODIMENTS

Embodiment 1

An embodiment 1 of the present invention will now be described with reference to the diagrams.

Figure 2A:
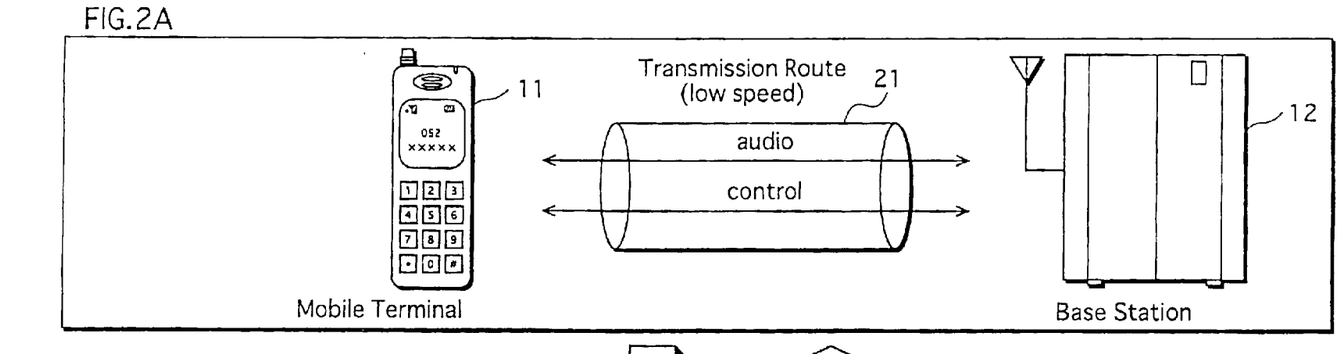
FIGS. 2A & 2B show a schematic structure of a mobile communications system according to an embodiment 1, as well as a condition of wireless transmission routes before and after HHO having been conducted by the system.
Figure 2B:
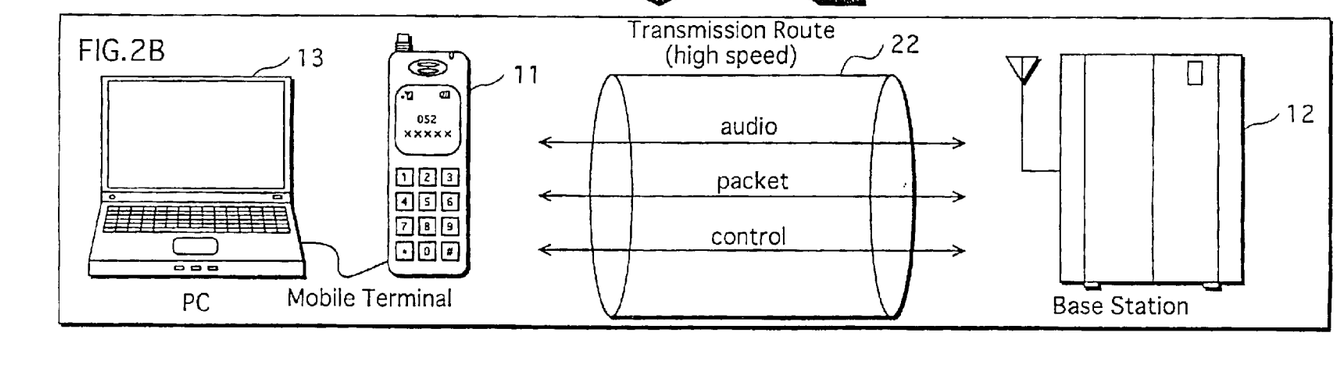

FIGS. 2A and 2B show a schematic structure of a mobile communications system according to embodiment 1, as well as a condition of wireless transmission routes before and after HHO (i.e. hard handover) has been conducted by the system.

The mobile communications system in FIGS. 2A and 2B includes a mobile terminal 11 and a base station 12.

FIG. 2A shows the transmission route between mobile terminal 11 and base station 12 before HHO has been conducted. Prior to HHO, mobile terminal 11 and base station 12 conduct audio communication using a transmission route 21. Audio data and control information are transmitted bidirectionally over transmission route 21.

FIG. 2B shows the transmission route between mobile terminal 11 and base station 12 after HHO has been conducted. Subsequent to HHO, packet communication relating to a moving image distribution service and the like is conducted at the same time as audio communication using a transmission route 22. In addition to audio data and control information, transmission route 22 is used for the bidirectional transmission of data such as moving image stream data that is, for example, distributed by a moving image distribution server (not depicted) to mobile terminal 11 via base station 12, or sent by mobile terminal 11 to another terminal via base station 12.

Mobile terminal 11 reproduces audio data received from base station 12. Mobile terminal 11 also forwards the received audio data to a personal computer 13 ("PC" in FIG. 2B), which reproduces the forwarded audio data.

Here, the communication shown in FIG. 2A is not limited to audio communication, and may involve packet communication. Also, the communication shown in FIG. 2B is not limited to a combination of audio and packet communication, and may involve other combinations, examples of which includes a plurality of audio communications or a plurality of packet communications. Moreover, the packet communication is not limited to the content described above, and may relate to a music distribution service, a TV phone distribution service, an Internet connection service, or the like.

Figure 3:
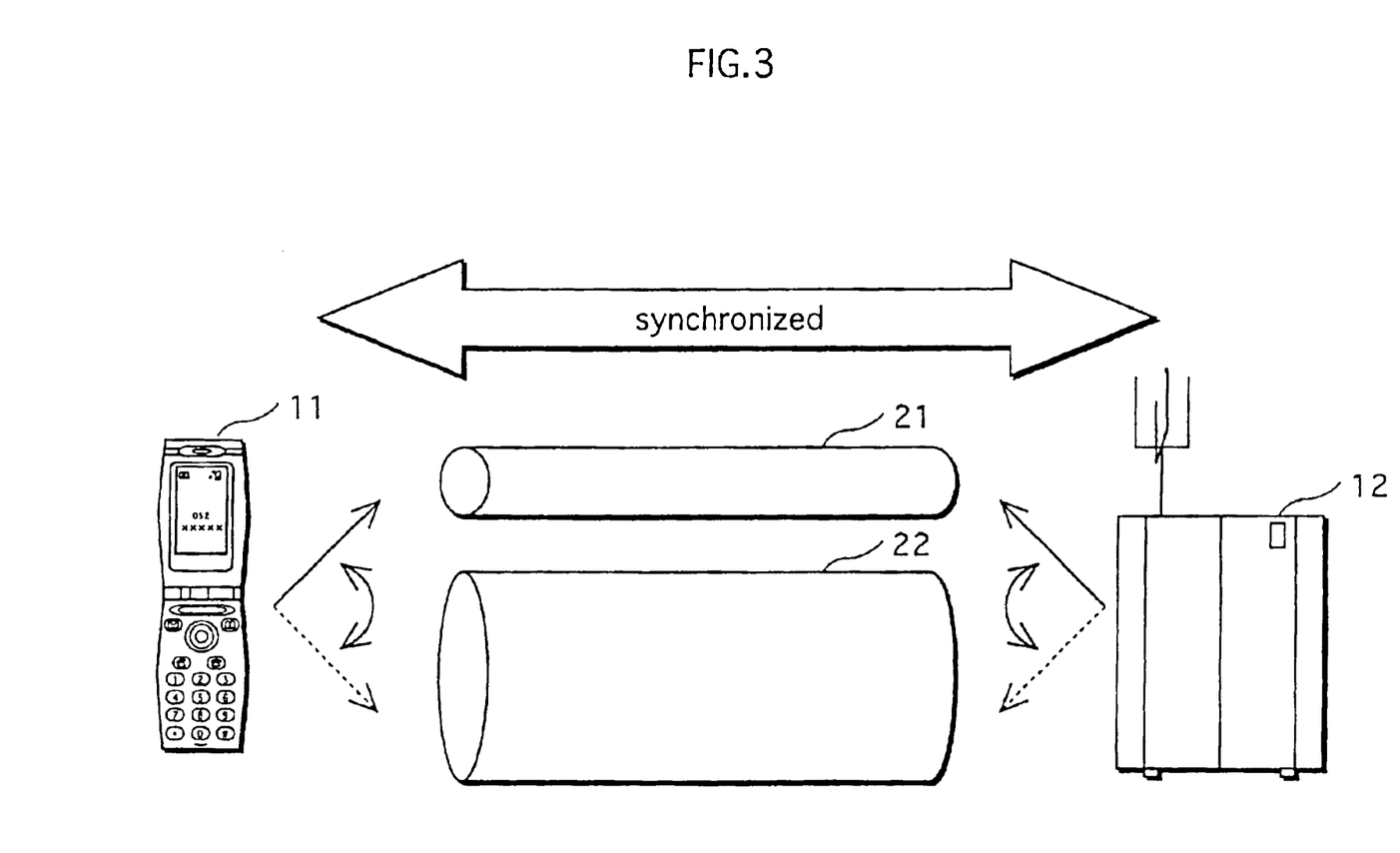
FIG. 3 shows the switching of channels by HHO.

As shown in FIG. 3, mobile terminal 11 and base station 12 can switch from transmission route 21 to transmission route 22 by conducting HHO. The reverse (i.e. switching from transmission route 22 to transmission route 21) can also be achieved by HHO. HHO is conducted, for example, when mobile terminal 11 or base station 12 receive either a request from the user of mobile terminal 11 or an instruction sent to base station 12 via a network.

If, for example, during audio communication with base station 12 using transmission route 21, mobile terminal 11 receives an instruction from the user to add packet communication, mobile terminal 11 notifies base station 12 of the instruction. Mobile terminal 11 and base station 12 then disconnect from transmission route 21 and attempt to connect using transmission route 22. In other words, mobile terminal 11 and base station 12 attempt to establish spreading code synchronization using transmission route 22. In order to establish spreading code synchronization, a timing of the despreading conducted by mobile terminal 11 using a spreading code must be matched with a timing in a spreading signal sent from base station 12. If spreading code synchronization is established, communication between mobile terminal 11 and base station 12 is commenced using transmission route 22.

Furthermore, the time elapsed from when mobile terminal 11 and base station 12 initiate attempts to establish synchronization is measured, and if synchronization over transmission route 22 is not established before a predetermined time period has elapsed, the operation is terminated and synchronization is established over transmission route 21 in order to recommence audio communication using transmission route 21.

A functional structure of mobile terminal 11 and base station 12 will now be described.

Structure of Mobile Terminal 11

Figure 4:
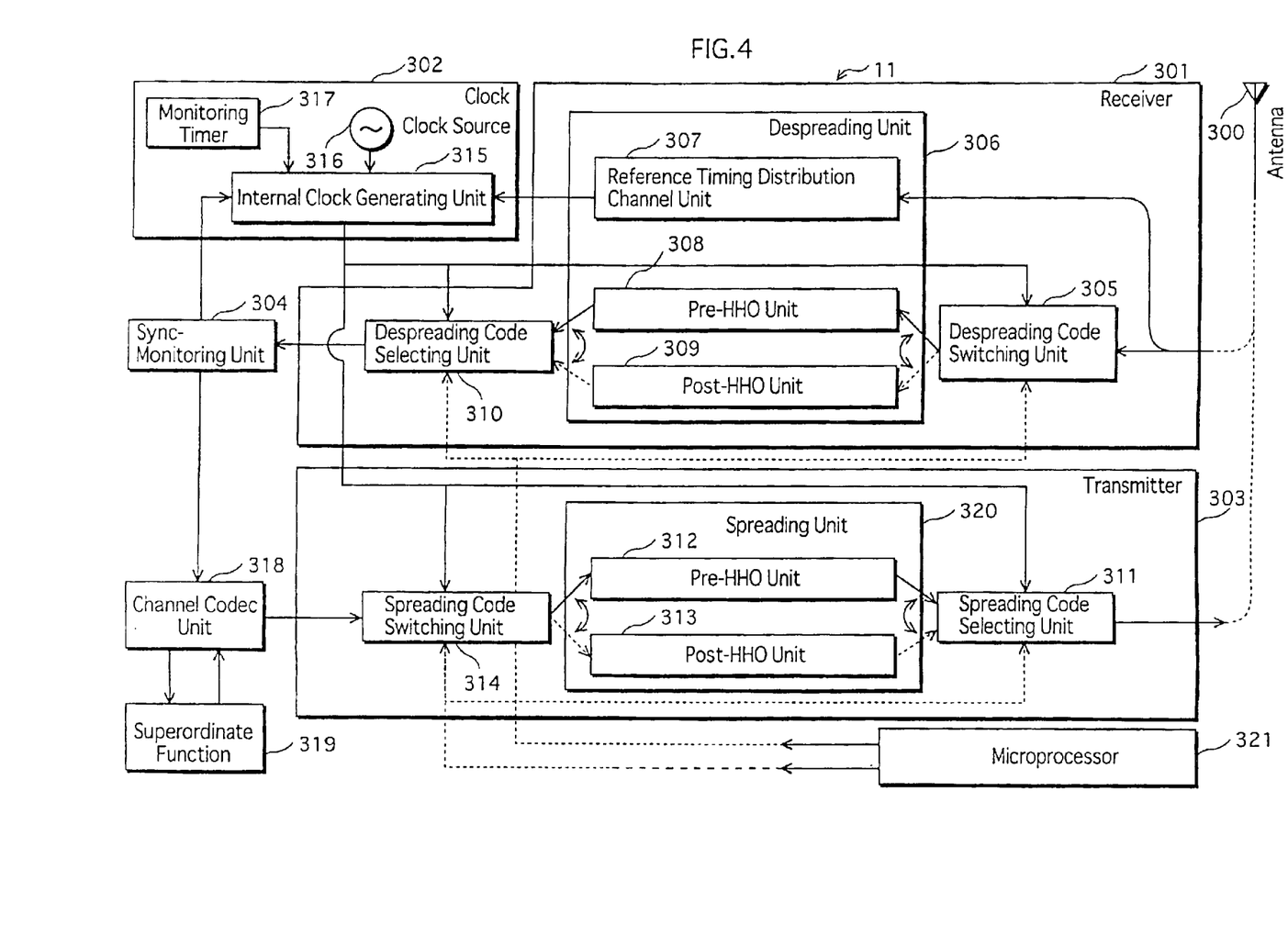
FIG. 4 is a functional block diagram showing the structure of a mobile terminal 11.

FIG. 4 is a functional block diagram of mobile terminal 11.

As shown in FIG. 4, mobile terminal 11 is structured from an antenna 300, a receiver 301, a transmitter 303, a clock 302, and a microprocessor 321.

Structure of Receiver 301

A wireless signal inputted to antenna 300 is amplified by a low noise amplifier and undergoes analogue-digital conversion before being inputted to receiver 301. Hereafter, the signal inputted to receiver 301 from antenna 300 is referred to as a "spreading signal".

The following description relates to the generation of a reference timing by mobile terminal 11. "Reference timing" here refers to the timing used by mobile terminal 11 to establish spreading code synchronization with base station 12. The generation of this timing is based on a reference timing distribution channel signal sent from base station 12.

Next, the spreading signal inputted to receiver 301 from antenna 300 is inputted into a despreading code switching unit 305 and a reference timing distribution channel unit 307 included in a despreading unit 306. Reference timing distribution channel unit 307 uses a unique spreading code to despread the inputted spreading signal, and demodulates the reference timing distribution channel signal included in the spreading signal. Unit 307 then sends the demodulated reference timing distribution channel signal to an internal clock generating unit 315 included in clock 302.

Internal clock generating unit 315 includes a PLL (phase-locked loop) circuit, and functions to synchronize a reference signal from a clock source 316 with the reference timing distribution channel signal. Unit 315 thus generates a reference timing signal to be used by mobile terminal 11, and sends the generated signal to each of the units included in receiver 301 and transmitter 303.

The demodulation of audio data and moving image stream data will now be described.

In addition to reference timing distribution signal unit 307 described above, despreading unit 306 includes two other despreading units corresponding to channels used for communication by the user. These are a pre-HHO unit 308 and a post-HHO unit 309.

Pre-HHO unit 308 stores a spreading code for demodulating spreading signals transmitted during communication using transmission route 21 (i.e. prior to HHO processing), and functions to despread the inputted spreading signal using the stored spreading code and to extract data included in the audio data and control information. Post-HHO unit 309 stores a spreading code for demodulating spreading signals transmitted during communication using transmission route 22 (i.e. subsequent to HHO processing), and functions to despread the inputted spreading signal using the stored spreading code and to extract data included in the audio data, control information, and moving image stream data.

Prior to pre-HHO unit 308 and a post-HHO unit 309 conduct the spreading, the spreading codes stored in units 312 and 313 are determined by microprocessor 321 communicating with base station 12 via a control channel.

Despreading code switching unit 305 and a despreading code selecting unit 310 function to alternately operate pre-HHO unit 308 and post-HHO unit 309. Unit 305 inputs the spreading signal into either pre-HHO unit 308 or post-HHO unit 309, and has the unit that receives the input conduct HHO processing. Unit 310 switches alternately between the output of units 308 and 309 and sends the output of one of these units to sync-monitoring unit 304. The switching of pre-HHO unit 308 and post-HHO unit 309 by units 305 and 310 is conducted under the control of microprocessor 321.

By communicating with base station 12 via the control channel, microprocessor 321 receives from base station 12, information (hereafter "HHO information"; described in a later section) relating to a timing at which units 305 and 310 should be switched. In accordance with the received HHO information and the reference timing generated by despreading code switching unit 305, microprocessor 321 sends instructions to units 305 and 310, and switches these two units. Under the control of microprocessor 321, pre-HHO unit 308 is operated prior to HHO switching being conducted, and post-HHO unit 309 is operated subsequent to HHO switching being conducted.

The output of despreading code selecting unit 310 is monitored synchronously by sync-monitoring unit 304, and sent to a channel codec unit 318, which conducts error correction. Audio data, moving image stream data and the like are then extracted from the error-corrected output and sent to a superordinate function 319. Superordinate function 319 may be a unit having a telephone function or a unit for interfacing with PC 13.

Structure of Transmitter 303

The structure of transmitter 303 will now be described.

When user data such as audio data and moving image stream data for transmitting to base station 12 from mobile terminal 11 is sent from superordinate function 319 to channel codec unit 318, unit 318 conducts error-correction coding with respect to the user data and sends the error-correction coded user data to a spreading code switching unit 314 in transmitter 310.

As with despreading code switching unit 305 and despreading code selecting unit 310 in receiver 301, spreading code switching unit 314 and a spreading code selecting unit 311 function to alternately operate a pre-HHO unit 312 and a post-HHO unit 313. As with receiver 301 above, this switching is conducted under the control of microprocessor 321. Thus, under the control of microprocessor 321, pre-HHO unit 312 is operated prior to HHO being conducted, and post-HHO unit 313 is operated subsequent to HHO being conducted.

Pre-HHO unit 312 stores a spreading code for spreading data included in audio data and control information transmitted by communication over transmission route 21 prior to HHO being conducted, and functions to spread inputted data using the spreading code and output the resultant spreading signal.

Post-HHO unit 313 stores a spreading code for spreading data included in audio data, control information, and moving image stream data transmitted by communication over transmission route 22 subsequent to HHO being conducted, and functions to spread inputted data using the spreading code and output the resultant spreading signal.

Prior to pre-HHO unit 312 and a post-HHO unit 313 conducting the spreading, the spreading codes stored in units 312 and 313 are determined by microprocessor 321 communicating with base station 12 via a control channel.

The spreading signal selected and outputted by spreading code selecting unit 311 is outputted as a wireless signal from antenna 300 after undergoing analogue modulation.

Structure of Clock 302

The structure of clock 302 will now be described.

Clock 302 includes internal clock generating unit 315, clock source 316, and a monitoring timer 317.

As mentioned above, internal clock generating unit 315 extracts a timing from the reference timing distribution channel signal sent from base station 12, generates a reference timing signal for mobile terminal 11 by synchronizing the reference signal generated by clock source 316 with the extracted timing, and sends the generated reference timing signal to microprocessor 321 and each of the units included in receiver 301 and transmitter 303.

Furthermore, internal clock generating unit 315 receives a report from sync-monitoring unit 304 as to whether or not synchronization has been established. On receipt of a report that synchronization has not been established, unit 315 confirms whether the clock of clock source 316 is synchronized with the reference timing.

Structure of Base Station 12

The structure of base station 12 will now be described.

Figure 5:
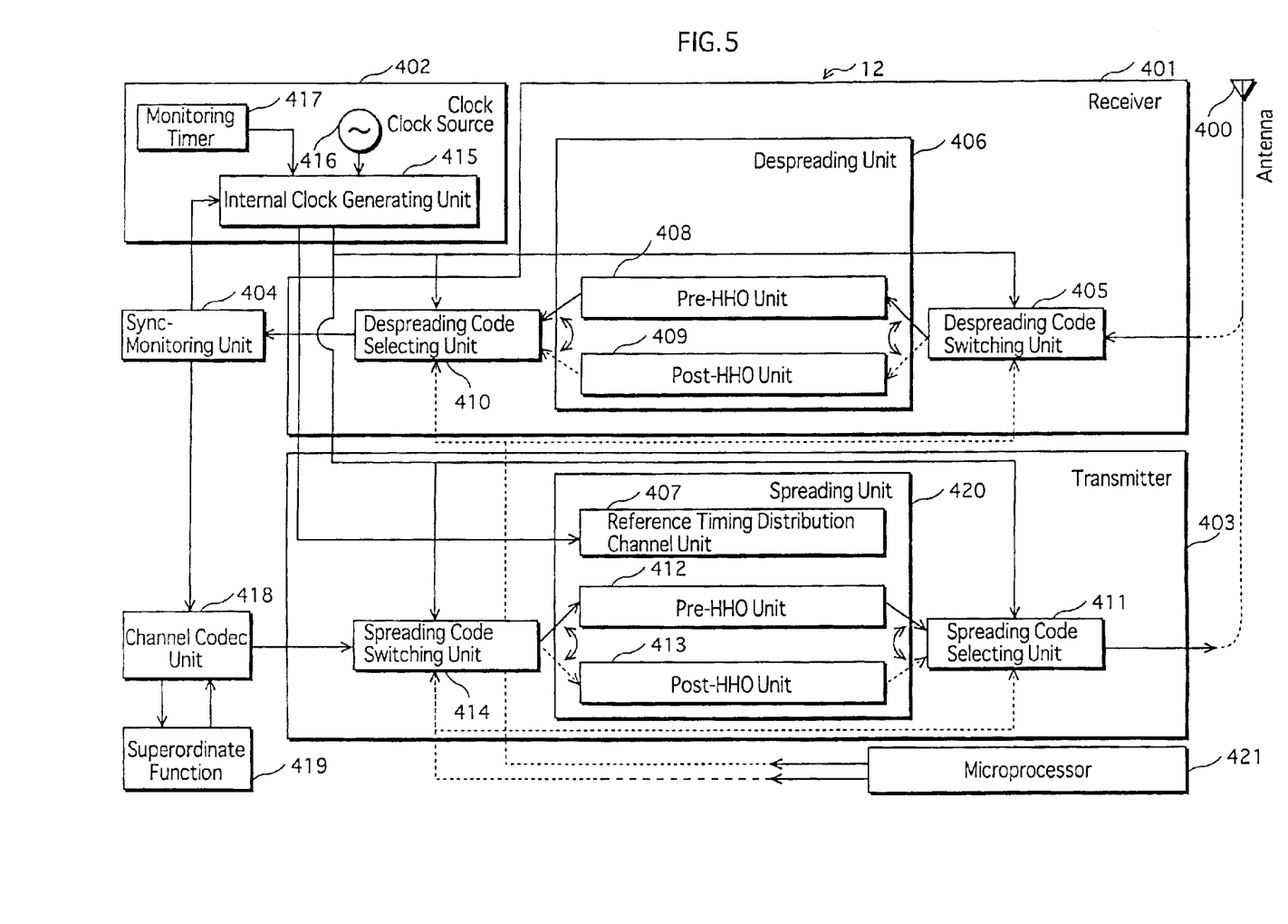
FIG. 5 is a functional block diagram showing the structure of a base station 12.

FIG. 5 is a functional block diagram showing the structure of base station 12.

As shown in FIG. 5, base station 12 has basically the same structure as mobile terminal 11 in FIG. 4. However, base station 12 differs from mobile terminal 11 in that a reference timing distribution channel unit 407 is included in spreading unit 420 instead of in despreading unit 406.

This is because the reference timing distribution channel is used for conducting unidirectional communication from base station 12 to mobile terminal 11. In other words, base station 12 uses internal clock generating unit 415 to divide the clock generated by clock source 416 into an appropriate frequency, and uses this frequency as the reference timing for each of the units in base station 12. Base station 12 also generates the reference timing distribution channel signal based on this reference timing, and uses reference timing distribution channel unit 407 to distribute the generated signal to mobile terminal 11 via antenna 400.

The switching of units by a despreading code switching unit 405, a despreading code selecting unit 410, a spreading code selecting unit 411, and a spreading code switching unit 414 is, as with the corresponding units in mobile terminal 11, controlled by a microprocessor 421, and is conducted in synchronization with mobile terminal 11.

Processing Flow

The flow of the processing will now be described with reference to FIGS. 6A and 6B.

Figure 6A:
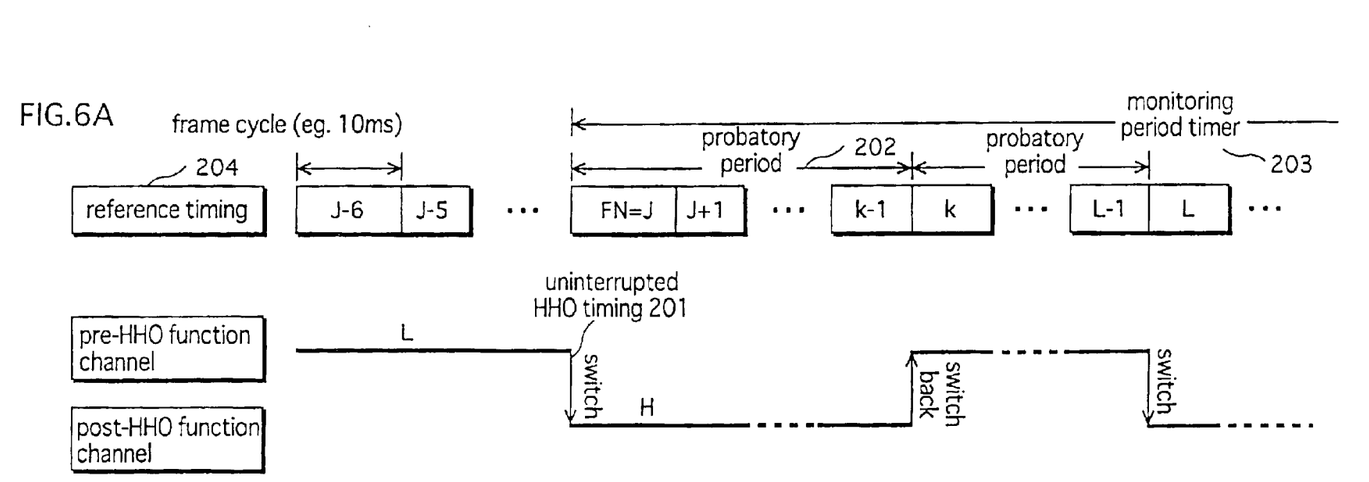
FIGS. 6A & 6B show the operations executed by base station 12 and mobile terminal 11.
Figure 6B:
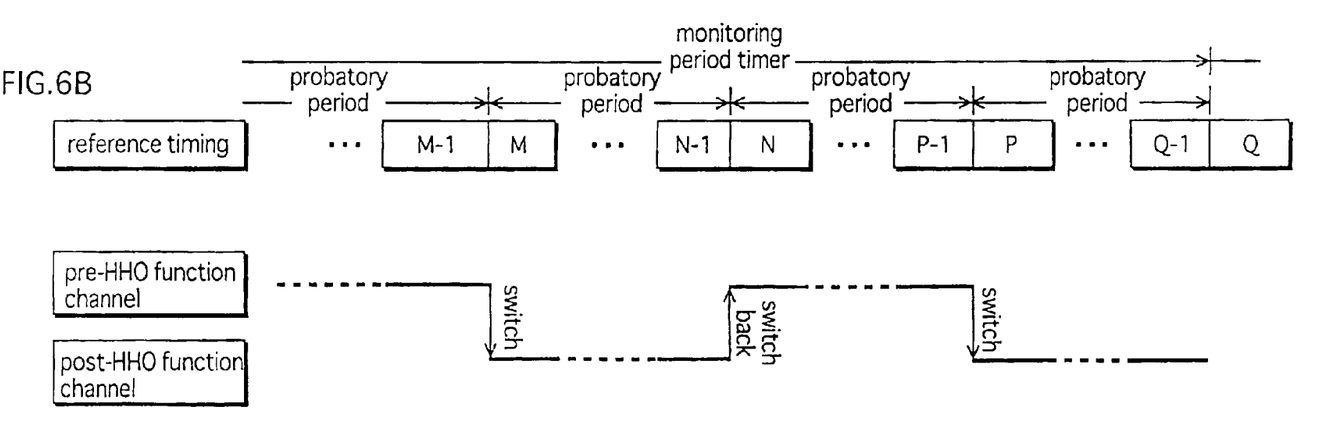

FIGS. 6A and 6B show the operations executed by base station 12 and mobile terminal 11. The operations shown in FIG. 6A occur prior to the operations shown in FIG. 6B.

In FIGS. 6A and 6B, the rectangular boxes marked J–6, J–5, . . . , J, J+1, . . . , K–1, K, . . . , L–1, L, . . . , M–1, M, and so on represent the frames.

In FIG. 6A, HHO is conducted at the beginning of frame J. Up until immediately before the timing of the HHO, base station 12 and mobile terminal 11 communicate using channel L (i.e. transmission route 21), and immediately after the timing of the HHO, base station 12 and mobile terminal 11 switch to channel H (i.e. transmission route 22) and attempt to establish spreading code synchronization.

An HHO timing 201 is determined between base station 12 and mobile terminal 11 on the basis of the reference timing and HHO information sent from base station 12.

After the switching at HHO timing 201, base station 12 and sync-monitoring unit 304 in mobile terminal 11 monitor the establishment of spreading code synchronization over function channel H.

The maximum time period allowable for spreading code synchronization to be established after HHO timing 201 is set in the above HHO information, and is referred to herein as a "probatory period". Monitoring timers 317 (FIG. 4) and 417 (FIG. 5) detect the elapse of a probatory period 202, and if synchronization has not been established when the elapse of probatory period 202 is detected, base station 12 and mobile terminal 11 switch back to function channel L used prior to the HHO processing, and attempt to establish synchronization over function channel L.

If synchronization cannot be established over function channel L before the elapse of a probatory period after switching back, then base station 12 and mobile terminal 11 once again switch (i.e. re-switch) to the post-HHO function channel H and attempt to establish synchronization.

Base station 12 and mobile terminal 11 continue to switch back and forth between the two channels until synchronization can be established over one of the channels.

Furthermore, the maximum time period allowable for synchronization to be established over either one of the channels is set, and is referred to herein as a "monitoring period". Monitoring timers 317 and 417 also function to detect the elapse of the monitoring period. If synchronization cannot be established over either channel before the elapse of the monitoring period, communication is disconnected.

The value of the probatory period and the monitoring period is not constant but variable. In the present embodiment, the probatory period is set at 500 ms, and the monitoring period is set at 2 s, for example. Of course, the probatory and monitoring periods need not have the same value each time, and thus the length of either period may increase or decrease each time.

As described above, if synchronization cannot be established over the function channel switched to immediately after the HHO timing, base station 12 and mobile terminal 11 switch back to the function channel used prior to the HHO timing, and attempt to establish synchronization.

According to this structure, it is possible to effectively avoid communication being disconnected when, for example, attempting to switch to a channel with respect to which synchronization may be difficult to establish due to a low spreading rate (e.g. as in the case of attempting to switch to higher speed communication). This is because even if synchronization cannot be established within a predetermined time period after switching, base station 12 and mobile terminal 11 switch back to the low speed channel (i.e. comparatively easy to establish synchronization) and attempt to establish synchronization. Also, the spreading codes of the two channels are not used in other communications during this period.

Figure 7:
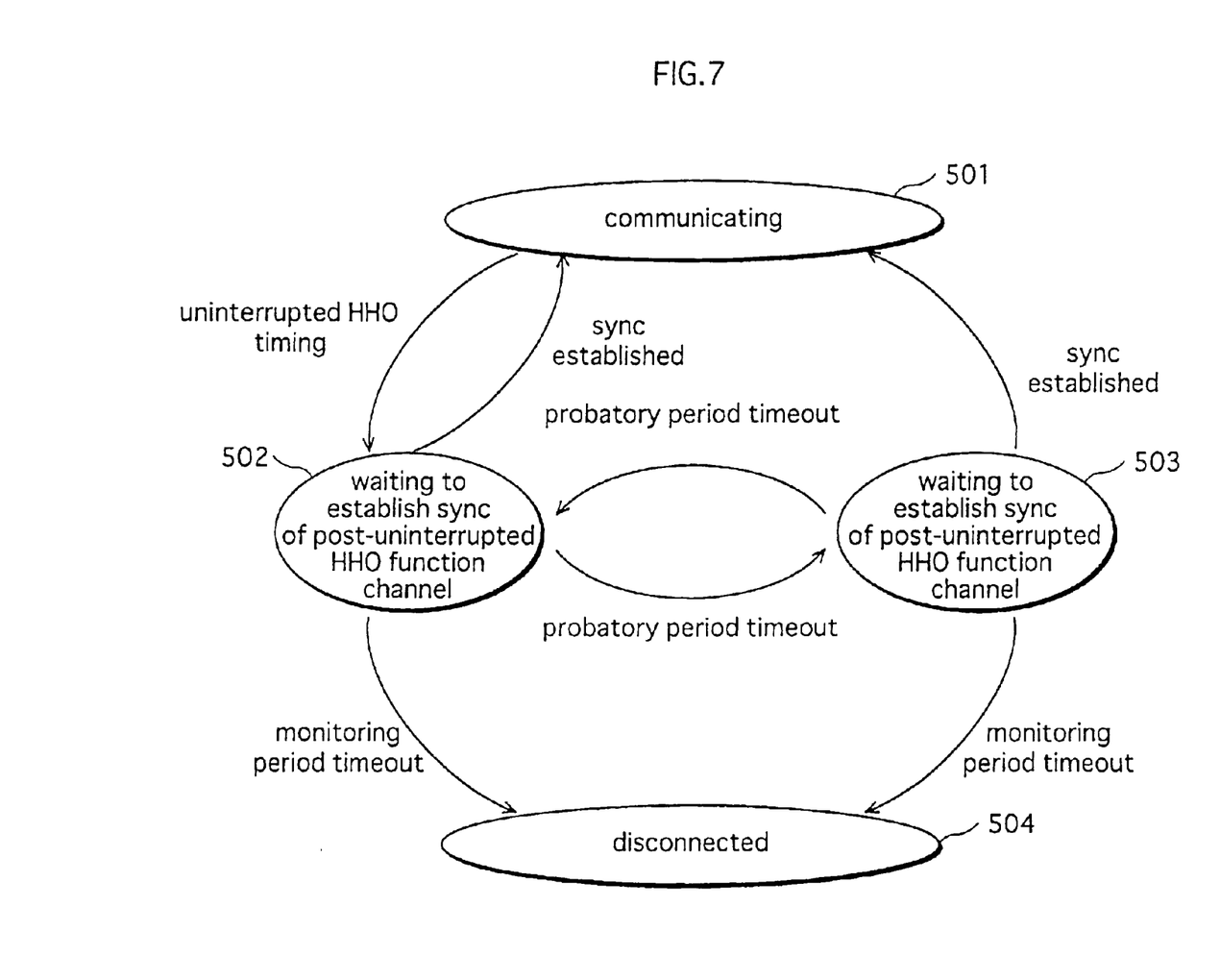
FIG. 7 shows the various conditions of base station 12 and mobile terminal 11.

FIG. 7 shows the various conditions of base station 12 and mobile terminal 11.

If HHO is executed when base station 12 and mobile terminal 11 are in a communication condition 501, base station 12 and mobile terminal 11 transfer to a sync-waiting condition 502 when the HHO is initiated, and attempt to establish synchronization over the post-HHO function channel.

Here, base station 12 and mobile terminal 11 both measure the elapse of the probatory period immediately following the transition to condition 502, and if the probatory period elapses before synchronization can be established, base station 12 and mobile terminal 11 transfer to a sync-waiting condition 503 and initiate attempts to establish synchronization over the pre-HHO function channel.

As with condition 502, base station 12 and mobile terminal 11 both measure the elapse of the probatory period immediately following the transition to condition 503, and if the probatory period elapses before synchronization can be established, base station 12 and mobile terminal 11 transfer again to sync-waiting condition 502 and initiate attempts to establish synchronization over the post-HHO function channel.

Base station 12 and mobile terminal 11 alternate between conditions 502 and 503 until synchronization is established prior to the elapse of the probatory period in one of the conditions, and when synchronization is established, base station 12 and mobile terminal 11 transfer to communication condition 501.

Furthermore, base station 12 and mobile terminal 11 measure the elapse of the monitoring period immediately following the transition from condition 501 to condition 502, and if the monitoring period elapses when base station 12 and mobile terminal 11 are in one of conditions 502 and 503, base station 12 and mobile terminal 11 transfer to a disconnected condition 504 and cease attempts to establish synchronization.

Embodiment 2

The follows relates to an embodiment 2 of the present invention. The description focuses on the differences of embodiment 2 from embodiment 1.

Figure 8:
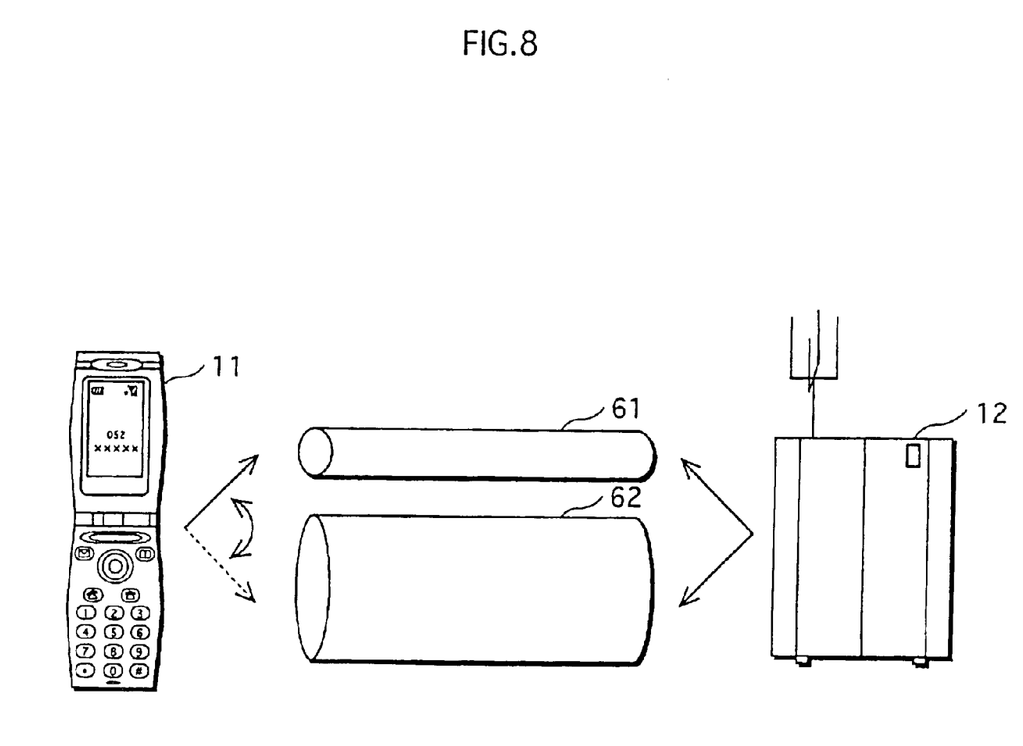
FIG. 8 shows channel switching according to an embodiment 2.

FIG. 8 shows channel switching according to embodiment 2.

In FIG. 8, transmission routes 61 and 62 correspond to transmission routes 21 and 22, respectively, in FIG. 3.

Base station 12 conducts transmission simultaneously over transmission routes 61 and 62. That is, base station 12 uses transmission route 61 to transmit audio data and control information for audio communication to mobile terminal 11, and at the same time uses transmission route 62 to transmit audio data, control information, and moving image stream data for audio communication and packet communication to mobile terminal 11.

Mobile terminal 11 uses transmission route 61 to conduct audio communication with base station 12 prior to HHO processing, and uses transmission route 62 to conduct audio and packet communication with base station 12 subsequent to HHO processing.

Thus, in embodiment 2, as mentioned above, base station 12 simultaneously uses transmission routes 61 and 62 to transmit various data, whereas mobile terminal 11 uses transmission route 61 prior to HHO and transmission route 62 subsequent to HHO.

On receipt of an instruction to conduct HHO during communication over transmission route 61, mobile terminal 11 initiates establish-sync processing over transmission route 62, and uses an internal timer to measure the time period elapsed from the start of the processing. If synchronization over transmission route 62 is established before the elapse of a predetermined probatory period, mobile terminal 11 notifies base station 12 and communication using transmission route 61 is ceased. On the other hand, if synchronization over transmission route 62 cannot be established before the elapse of the probatory period, mobile terminal 11 ceases the establish-sync processing, and attempts to establish synchronization over transmission route 61 in order to recommence communication over transmission route 61.

Here, if synchronization over transmission route 61 cannot be established before the elapse of a predetermined period from the start of the establish-sync processing, then mobile terminal 11 again attempts to establish synchronization over transmission route 62.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A mobile communications system based on the CDMA standard and having a mobile terminal and a base station, comprising:

communication means for using a first communication channel to conduct communication relating to a first call between the mobile terminal and the base station;

determining means for determining a first time and a second time mutually between the mobile terminal and the base station;

sync-establishing means for, when the first time is reached, having the communication means cease communication using the first communication channel, and attempting to establish synchronization between the mobile terminal and the base station in order to commence using a second communication channel to conduct communication relating to both the first call and a second call; and recommencing means for, if synchronization cannot be established before the second time is reached, having the sync-establishing means cease attempts to establish synchronization, and having the communication means recommence using the first communication channel to conduct communication relating to the first call.

2. The mobile communications system of claim 1, wherein the communication means has:

a terminal communication unit included in the mobile terminal, and for using the first communication channel to conduct communication relating to the first call with the base station; and a station communication unit included in the base station, and for using the first communication channel to conduct communication relating to the first call with the mobile terminal, the determining means has:

a request notifying unit included in the mobile terminal, and for receiving a communication channel switching request from a user and notifying the base station of the received request;

a time notifying unit included in the base station, and for determining the first time and the second time in accordance with the notified request, and notifying the mobile terminal of the determined times; and an obtaining unit included in the mobile terminal, and for obtaining the determined times notified by the time notifying unit, the sync-establishing means has:

a distribution unit included in the base station, and for, when the first time determined by the time notifying unit is reached, distributing a synchronization signal in order to establish synchronization over the second communication channel; and a notifying unit included in the mobile terminal, and for, when the first time obtained by the obtaining unit is reached, receiving the distributed synchronization signal, detecting for a synchronization timing, and notifying the base station that synchronization has been established if the synchronization timing is detected, and the recommencing means has:

a terminal recommencing unit included in the mobile terminal, and for, if the synchronization timing cannot be detected before the second time obtained by the obtaining unit is reached, having the detecting unit cease detecting for the synchronization signal, and having the terminal communication unit recommence using the first communication channel to conduct communication relating to the first call; and a station recommencing unit included in the base station, and for, if notification of synchronization being established is not received before the second time determined by the time notifying unit is reached, having the station communication unit recommence using the first communication channel to conduct communication relating to the first call.

3. The mobile communications system of claim 1, wherein the determining means determines a third time mutually between the mobile terminal and the base station, and the recommencing means has the sync-establishing means try again to establish synchronization if communication by the communication means using the first communication channel cannot be recommenced before the third time determined by the determining means is reached.

4. A mobile communications system based on the CDMA standard and having a mobile terminal and a base station, the base station including:

first communication means for using a first communication channel to conduct communication relating to a first call with the mobile terminal; and second communication means for, in parallel with communication conducted by the first communication means, using a second communication channel to conduct communication relating to both the first call and a second call with the mobile terminal, and the mobile terminal including:

third communication means for using the first communication channel to conduct communication relating to the first call with the base station;

storage means for storing in advance a first time and a second time;

sync-establishing means for, when the first time is reached, having the third communication means cease communication using the first communication channel, and attempting to establish synchronization with the base station in order to commence using the second communication channel to conduct communication relating to both the first and second calls; and recommencing means for, if synchronization cannot be established before the second time is reached, having the sync-establishing means cease attempts to establish synchronization, and having the third communication means recommence using the first communication channel to conduct communication relating to the first call.

5. The mobile communications system of claim 4, wherein the sync-establishing means notifies the base station if synchronization is established, and the first communication means ceases communication using the first communication channel if the base station is notified by the sync-establishing means that synchronization has been established.

6. A mobile terminal used in a mobile communications system based on the CDMA standard, comprising:

communication means for using a first communication channel to conduct communication relating to a first call with a base station;

storage means for storing in advance a first time and a second time;

sync-establishing means for, when the first time is reached, having the communication means cease communication using the first communication channel, and attempting to establish synchronization with the base station in order to commence using a second communication channel to conduct communication relating to both the first call and a second call; and recommencing means for, if synchronization cannot be established before the second time is reached, having the sync-establishing means cease attempts to establish synchronization, and having the communication means recommence using the first communication channel to conduct communication relating to the first call.

7. A method for conducting mobile communications between a mobile terminal and a base station based on the CDMA standard, comprising:

a communication step of using a first communication channel to conduct communication relating to a first call between the mobile terminal and the base station;

a determining step of determining a first time and a second time mutually between the mobile terminal and the base station;

a sync-establishing step of, when the first time is reached, ceasing communication using the first communication channel, and attempting to establish synchronization between the mobile terminal and the base station in order to commence using a second communication channel to conduct communication relating to both the first call and a second call; and a recommencing step of, if synchronization cannot be established before the second time is reached, ceasing attempts to establish synchronization, and recommencing use of the first communication channel to conduct communication relating to the first call.

8. A method for conducting mobile communications between a mobile terminal and a base station based on the CDMA standard, comprising:

a first communication step performed in the base station, and of using a first communication channel to conduct communication relating to a first call with the mobile terminal;

a second communication step performed in the base station, and of, in parallel with communication conducted in the first communication step, using a second communication channel to conduct communication relating to both the first call and a second call with the mobile terminal;

a third communication step performed in the mobile terminal, and of using the first communication channel to conduct communication relating to the first call with the base station;

a sync-establishing step performed in the mobile terminal, and of (i) storing a first time and a second time in an internal memory of the mobile terminal, and (ii) when the first time is reached, ceasing communication using the first communication channel, and attempting to establish synchronization with the base station in order to commence using the second communication channel to conduct communication relating to both the first and second calls; and a recommencing step of, if synchronization cannot be established before the second time is reached, ceasing attempts to establish synchronization, and recommencing use of the first communication channel to conduct communication relating to the first call.

* * * * *